United States Patent [19]

Yamaguchi et al.

[11] 3,916,038

[45] Oct. 28, 1975

[54] PROCESS OF PRODUCING MOLDABLE MAGNETIC POWDER OF THE FERRITE TYPE

[75] Inventors: Tadashi Yamaguchi; Hiroshi Kojima; Takayuki Ono, all of Sendai; Hiroshi Hoshi, Narashino; Michio Hirakwa; Isao Watanabe, both of Ichikawa, all of Japan

[73] Assignee: Lion Yushi Kabushiki Kaisha, Tokyo, Japan

[22] Filed: Feb. 23, 1973

[21] Appl. No.: 335,227

[30] Foreign Application Priority Data

Feb. 24, 1972 Japan.............................. 47-19536

[52] U.S. Cl. ............... 427/127; 427/385; 427/430; 252/62.54
[51] Int. Cl.² ........................................ H01F 1/113
[58] Field of Search ........................... 117/234–240, 117/100 B; 252/62.54; 427/127, 385, 430

[56] References Cited
UNITED STATES PATENTS

| 3,136,650 | 6/1964 | Avila | 117/235 X |
|---|---|---|---|
| 3,300,329 | 1/1967 | Orsino et al. | 117/100 X |
| 3,526,533 | 9/1970 | Jacknow et al. | 117/100 |
| 3,558,492 | 1/1971 | Proskow | 252/62.54 |
| 3,573,979 | 4/1971 | Honjo | 117/234 |
| 3,577,277 | 5/1971 | Fisher et al. | 117/234 |
| 3,592,687 | 7/1971 | Schnell et al. | 252/62.54 X |
| 3,627,682 | 12/1971 | Hall et al. | 117/235 X |
| 3,634,137 | 1/1972 | Akashi et al. | 117/235 |
| 3,640,767 | 2/1972 | Fulton et al. | 117/234 |
| 3,669,885 | 6/1972 | Wright | 117/100 X |
| 3,713,886 | 1/1973 | Fulton et al. | 117/234 |
| 3,718,594 | 2/1973 | Miller | 117/234 X |

*Primary Examiner*—Bernard D. Pianalto
*Attorney, Agent, or Firm*—William J. Daniel

[57] ABSTRACT

A process for producing a moldable magnetic particulate composition comprising core particles of a ferrite compound coated with a thermoplastic polymer comprising suspending the ferrite particles in an aqueous medium containing an ethylenically unsaturated monomer of a thermoplastic polymer in the presence of a bisulfite ion releasing compound and initiating polymerization of the monomer to cause the resulting polymer to be deposited in situ on the ferrite particles.

5 Claims, No Drawings

PROCESS OF PRODUCING MOLDABLE MAGNETIC POWDER OF THE FERRITE TYPE

BACKGROUND OF THE INVENTION

In general, a compound of the class of ferric oxides represented by the general formula:

$$MO.nFe_2O_3$$

wherein M is a divalent metal ion and $n$ is a positive number varying according to the proportion of $Fe_2O_3$ to MO, is called "ferrite" and has a characteristic ferromagnetic property. Because of this characteristic property, such ferrites are widely used as magnetic material in the manufacture of high frequency inductance coils and cores for transformers, small motors and the like. The processing of these ferrites to desired forms is usually carried out by methods wherein the ferrite powder is compression molded to a given shape and then sintered. Because of the need for sintering, the orientation of the ferrite particles in the product becomes irregular, thus unavoidably reducing the dimensional stability of the product. Where barium ferrite is shaped into articles, improvement in mechanical strength becomes extremely difficult.

On the other hand, it is known to disperse ferrite powder into plastics or rubbery materials and use the resulting product, for example, as magnetic plates. As considerably large amounts of plastic or rubbery material is required in this case to enhance the mechanical strength of the shaped composite articles, the magnetic strength of the shaped composite articles so obtained is weakened, thus detracting from the utility of such articles for cores in small motors or transformers.

In the field of electric and electronic industries, therefore, there is a large demand for magnetic materials capable of being mechanically fabricated into various kinds of shaped products without the necessity for any sintering treatment.

BRIEF SUMMARY OF THE INVENTION

Accordingly, it is an object of this invention to provide a particulate magnetic material capable of being mechanically fabricated into various shapes without any necessity for sintering.

It is another object of this invention to provide a process for effectively producing such a magnetic material.

It is still another object of this invention to provide various kinds of products obtained by compression molding of such magnetic material under heating.

Other and further objects, features and advantages of this invention will appear more fully from the following description.

DETAILED DESCRIPTION OF THE INVENTION

The particulate magnetic material of the ferrite type according to this invention, in essence, comprises discrete ferrite particles carrying a coating of a thermoplastic polymer and/or copolymer thereon.

The term ferrite used herein includes both ferromagnetic complex metal oxides represented by the general formula:

$$MO.nFe_2O_3$$

wherein M is a divalent metal ion such as $Ba^{++}$, $Mn^{++}$, $Zn^{++}$, $Pb^{++}$, $Sr^{++}$, $Co^{++}$, $Ni^{++}$ or $Cu^{++}$ and $n$ is a positive number variable according to the proportion of $Fe_2O_3$ to MO, and ferromagnetic metalloid compounds, such as magnetite ($Fe_3O_4$). These ferrite compounds are pulverized and used in the form of particles having a diameter of about 0.1 $\mu$ to 3 mm.

The thermoplastic polymers or copolymers used in the composition of this invention for coating the ferrite particles are all derived from one or more ethylenically unsaturated monomers and include homopolymers of acrylic acid and its esters, such as methyl acrylate and ethyl acrylate; methacrylic acid and its esters, such as methyl methacrylate and ethyl methacrylate; acrylonitrile; dienes, such as butadiene, isoprene and chloroprene; vinyl esters of fatty acids, such as vinyl acetate and vinyl propionate; aromatic vinyl compounds, such as styrene and α-methyl-styrene; and copolymers derived from two or more of these monomers. Such polymer and/or copolymer is coated on the ferrite particles in such a manner that a part or all of the surface of the ferrite particles is covered by the polymer or copolymer. The polymer and/or copolymer is used in an amount of 0.1–90%, preferably 0.1–50%, more preferably 1–20%, based on the volume of the total composition.

When the product is to be produced by simple compression molding of the magnetic material of this invention, the content of the polymer and/or copolymer may be high. However, if the product is to take the form of a sintered material obtained by compression molding followed by sintering of the molded article, it is preferable to decrease the content of polymer and/or copolymer in the composition.

The magnetic material can be produced by maintaining discrete particles of the ferrite in intimate contact with a given monomer or monomers in liquid form and then subjecting both to polymerization conditions. Intimate contact of the ferrite particles with the monomer is obtained, for example, by suspending the ferrite particles in fairly large volume of an inert liquid such as water and admixing the monomer with the dilute suspension. The monomer or monomers utilized in this case are free radical polymerizable or copolymerizable and used in an amount of 0.02–200 parts by weight per 100 parts by weight of the ferrite particles. After the ferrite particles are brought into intimate contact with the monomer, there is then admixed a conventional free radical polymerization initiator such as a persulfate, benzoyl peroxide or azo-bis-butyronitrile. The mixture is subjected, if necessary, by heating to polymerization which usually takes 1–5 hours. After completion of the polymerization, the resulting product is separated by filtration and dried to obtain the desired magnetic material.

It is advantageous to effect polymerization by adding to the monomeric mixture a substance capable of generating bisulfite ions, i.e., $HSO_3^-$, such as an aqueous sulfurous acid solution, sulfur dioxide, an aqueous solution of a bisulfite or an aqueous solution of sulfite, instead of adding the radical polymerization initiator. As the bisulfite ion behaves as a free radical polymerization initiator in the presence of ferrite, the use of a substance capable of generating bisulfite ion permits the formation of a polymer or copolymer in intimate contact with the ferrite particles. In this case, the amount of bisulfite ions calculated in terms of sulfur dioxide is 0.01–500 parts by weight, preferably 0.1–100 parts by weight for 100 parts by weight of the monomer.

The magnetic material of this invention comprising ferrite particles coated with a polymer and/or copolymer thereon is in the mass generally uniform in composition and can be processed to uniform shaped products by compression molding. The products thus obtained are highly improved in mechanical strength as compared with similar prior art products obtained by compression molding followed by sintering of ferrite particles. According to this invention, the quantity of polymer and/or copolymer is extremely small as compared with that used in composites of plastics and magnetic powder produced according to conventional mixing methods. Thus, highly dense magnetic articles having a high coercive force can be manufactured from the compositions of this invention. In addition to compression molding, the material of the invention can be fabricated by a variety of mechanical fabricating techniques including calendaring, sintering, cutting of previous produced structures, etc.

Magnetic material of this invention formulated with especially low polymer content of 5% by volume or less can be subjected, after compression molding, to sintering treatment according to a conventional method to obtain a sintered structure. Since no additional binder is needed in this case, there is a technical merit in elimination of the difficulty in conventional methods in achieving homogeneous mixing of a binder and ferrite powder.

PREFERRED EMBODIMENTS OF THE INVENTION

This invention will be understood more readily by reference to the following examples. However, these examples are intended to illustrate the invention and not to limit its scope.

EXAMPLE 1

Ten grams of barium ferrite powder are suspended in 100 g of water. To the suspension is added 10 g of 1% aqueous sulfurous acid solution and the temperature of the mixture is elevated to 50°C. Then, 0.4 g of monomeric methyl methacrylate is added and the mixture reacted for one hour to obtain at a polymerization rate of 80% composite particles of barium ferrite and polymer. The disdiscrete coated particles so obtained contain 15 vol.% (3 wt.%) of poly(methyl methacrylate).

The composite material showed excellent moldability when compression molded at 300°C under pressure of 400 kg./cm$^2$. The bending strength and magnetic properties of a molded composite product are shown below in comparison with those of a prior art product obtained by sintering.

| | Bending Strength (kg./cm$^2$) | Br (gauss) | Hc (oersted) |
|---|---|---|---|
| Product of Invention | 200 – 350 | 1700 | 1200 |
| Prior Art Sintered Product | 100 – 150 | 2000 | 1200 |

EXAMPLE 2

Ten grams of manganese zinc ferrite powder are suspended in 100 g of water. To the suspension is added 0.10 g of potassium persulfate and the temperature of the mixture elevated up to 75°C. Then, 0.14 g of monomeric styrene is added and the mixture reacted for 3 hours. The reaction product was filtered, washed and then dried in vacuo at 100°C to obtain 10.11 g of polymer-ferrite composite particles. Visually, the appearance of the composite material resembled that of untreated manganese zinc ferrite powder, although the composite material contains 5.4 vol. % of polystyrene. The composite powder is compression molded at 200°C under pressure of 2.4 tons/cm$^2$ and the molded product sintered at 1300°C for 30 minutes. Where a sintered structure is to be manufactured from the composite material of this invention, kneading with a high molecular substance such as polyvinyl alcohol or spraying such high molecular substance followed by drying may be omitted contrary to the case of manufacturing a sintered product according to a conventional method using such high molecular substance as a binder.

EXAMPLE 3

250 grams of lithium ferrite powder are suspended in 990 ml. of water. To this suspension is added 10 ml. of 2.1-N aqueous sulfurous acid solution and the temperature of the mixture elevated up to 50°C. Then, 24.7 g of monomeric methyl acrylate are added and the mixture reacted for 3 hours to obtain at a polymerization rate of 82.0% lithium ferrite-polymer composite particles containing 27.3 vol.% (7.5 wt.%) of poly(methyl acrylate) in the form of a fairly good suspension in the medium.

The composite material shows excellent moldability when compression molded at 300°C under pressure of 400 kg./cm$^2$ and has the following properties in molded form:

| | |
|---|---|
| Bending Strength | 250–390 kg./cm$^2$ |
| B$_r$ | 1700 gauss |
| H$_c$ | 1200 oersted. |

To the composite material is added 1.0 wt.% of BHT as an antioxidant and the material is then subjected to a sheet-forming treatment using two open rolls of 89 mm $\theta$ in diameter and 200 mm in width operated at a roll temperature of 85°C whereby a sheet having a thickness of 100 $\mu$ is obtained in three minutes. For the purpose of comparison, when lithium ferrite and poly(methyl acrylate) powder is mixed in a proportion equal to that of the composite material and the mixture subjected to sheet-forming treatment using the two open rolls under the same conditions, a sheet could not be formed.

EXAMPLE 4

250 grams of barium cobalt ferrite (3BaO.2CoO.1-2Fe$_2$O$_3$) are suspended in 990 ml of water. To the suspension is added 12.0 ml of 1.7-N aqueous sulfurous acid solution and the temperature of the mixture elevated up to 50°C. Then, 26.3g of monomeric n-butyl acrylate are added and the mixture reacted for 3 hours to obtain at a polymerization rate of 83.6% a barium cobalt ferrite-polymer composite particle containing 32.7 vol.% (8.1 wt.%) of poly(n-butyl acrylate) in well dispersed condition in the medium.

To the composite material is added 1.0 wt.% of BHT as an antioxidant and the material is then subjected to sheet-forming treatment using two open rolls of 89 mm θ in diameter and 200 mm in width operated at a roll temperature of 60°C whereby a sheet having a thickness of 120 μ is obtained in three minutes. For the purpose of comparison, barium cobalt ferrite powder and poly(n-butyl acrylate) are mixed in a proportion equal to that of the composite material and the mixture subjected to the sheet-forming treatment using the two open rolls under the same conditions but no sheet could be formed.

EXAMPLE 5

250 grams of magnetite (Fe$_3$O$_4$) powder are suspended in 990 ml of water. To the suspension is added 10 ml of 2.0-N aqueous sulfurous acid solution and the temperature of the mixture elevated up to 50°C. Then, 25.3 g of monomeric vinyl chloride are added and the mixture reacted to 3 hours to obtain at a polymerization rate of 73.4% magnetite-polymer composite particles containing 21.5 vol.% (6.9 wt.%) of polyvinyl chloride in the form of a fairly good dispersion.

This composite material shows extremely good moldability when compression molded at 300°C under pressure of 400 kg./cm$^2$.

The bending strength and magnetic properties of the composite in molded form are shown below in comparison with those of a prior art form produced by sintering.

|  | Bending Strength (kg./cm$^2$) | B$_r$ (gauss) | H$_c$ (oersted) |
|---|---|---|---|
| Product of Invention | 250 – 450 | 1700 | 1200 |
| Prior Art Sintered Product | 100 – 150 | 2000 | 1200 |

EXAMPLE 6

250 grams of barium ferrite powder are suspended in 1.0 liter of water. To the suspension is added 20 ml of 2.1-N aqueous sulfurous acid solution and the temperature of the mixture elevated up to 50°C. Then, 24.9 g of monomeric butadiene are added and the mixture reacted for 3 hours to obtain at a polymerization rate of 84.1% barium ferrite-polymer composite particles containing 30.9 vol.% (7.8 wt.%) of polybutadiene in fairly good state of dispersion.

To the composite material is added 1.0 wt.% of BHT as an antioxidant and the material is then subjected to a sheet-forming operation using two open rolls of 89 mm θ in diameter and 200 mm in length operated at a roll temperature of 60°C whereby a sheet having a thickness of 130 μ is obtained in 3 minutes. For the purpose of comparison, barium ferrite powder and polybutadiene powder are mixed in a proportion equal to that of the composite material and the mixture is subjected to the same sheet-forming operation but no sheet could be obtained.

What is claimed is:

1. A process for producing a moldable magnetic particulate composition comprising finely divided discrete core particles of a ferrite compound coated with a thermoplastic polymer of at least one ethylenically unsaturated monomer, which comprises the steps of suspending said discrete ferrite particles in an aqueous medium containing at least one ethylenically unsaturated monomer of a thermoplastic polymer insoluble in said medium in the presence of a compound releasing bisulfite ions in said aqueous medium and initiating polymerization of said monomer to cause the resultant polymer to be deposited in situ as an intimate coating of said particles.

2. The process of claim 1 wherein said medium is heated to promote said polymerization.

3. The process of claim 1 wherein the amount of said bisulfite ions calculated in terms of sulfur dioxide is about 0.01–500 parts per weight per 100 parts by weight of said monomer.

4. The process of claim 1 wherein said particles have a diameter of about 0.1μ to about 3μ and said coating constitutes about 1–20% by volume of said particles.

5. The process of claim 1 wherein said monomer and ferrite particles are present in a ratio of about 0.0002–2:1 by weight.

* * * * *

UNITED STATES PATENT AND TRADEMARK OFFICE
CERTIFICATE OF CORRECTION

PATENT NO. : 3,916,038
DATED : October 28, 1975
INVENTOR(S) : Tadashi Yamaguchi et al It is certified that error appears in the above-identified patent and that said Letters Patent are hereby corrected as shown below:

Column 5, cancel Example 5 in its entirety (lines 10 through 37);
renumber "Example 6" to -- Example 5 -- (line 40).

Signed and Sealed this tenth Day of February 1976

[SEAL]

Attest:

RUTH C. MASON
Attesting Officer

C. MARSHALL DANN
Commissioner of Patents and Trademarks